United States Patent
Diosdado Borrego et al.

(10) Patent No.: US 11,865,616 B2
(45) Date of Patent: Jan. 9, 2024

(54) DECAKING 3D PRINTED PARTS

(71) Applicant: Hewlett-Packard Development Company, L.P., Spring, TX (US)

(72) Inventors: Jorge Diosdado Borrego, Barcelona (ES); Michel Georges Encrenaz, Rubi (ES); Sergio Puigardeu Aramendia, Sant Cugat del Valles (ES); Rocio Munoz Moreno, Madrid (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 29 days.

(21) Appl. No.: 17/338,125

(22) Filed: Jun. 3, 2021

(65) Prior Publication Data

US 2022/0388068 A1    Dec. 8, 2022

(51) Int. Cl.
| | |
|---|---|
| *B22F 10/68* | (2021.01) |
| *B22F 10/73* | (2021.01) |
| *B22F 12/90* | (2021.01) |
| *B33Y 40/20* | (2020.01) |
| *B33Y 50/02* | (2015.01) |
| *B29C 64/393* | (2017.01) |
| *B29C 64/35* | (2017.01) |
| *B33Y 40/00* | (2020.01) |

(Continued)

(52) U.S. Cl.
CPC .............. *B22F 10/68* (2021.01); *B22F 10/73* (2021.01); *B22F 12/90* (2021.01); *B29C 64/35* (2017.08); *B29C 64/357* (2017.08); *B29C 64/393* (2017.08); *B33Y 40/00* (2014.12); *B33Y 40/20* (2020.01); *B33Y 50/02* (2014.12); *B22F 10/14* (2021.01); *B29C 64/165* (2017.08); *B33Y 10/00* (2014.12)

(58) Field of Classification Search
CPC ....... B29C 64/35; B29C 64/393; B33Y 50/00; B33Y 50/02; B28B 1/001
See application file for complete search history.

(56) References Cited

U.S. PATENT DOCUMENTS

| | | |
|---|---|---|
| 2017/0113449 A1 | 4/2017 | Haupt et al. |
| 2017/0310935 A1 | 10/2017 | Sinclair |

(Continued)

FOREIGN PATENT DOCUMENTS

| | | |
|---|---|---|
| WO | WO 2020/076295 | 4/2020 |
| WO | WO-2020076295 A1 * | 4/2020 |

OTHER PUBLICATIONS

Rishmawi, Issa, Tailoring green and sintered density of pure iron parts using binder jetting additive manufacturing, Oct. 9, 2018, Elsevier B.V., 508-520 (Year: 2018).*

*Primary Examiner* — Xiao S Zhao
*Assistant Examiner* — Nicholas J Chidiac
(74) *Attorney, Agent, or Firm* — SHOOK, HARDY & BACON L.L.P.

(57) ABSTRACT

In one example, a decaking system for 3D printing includes a platform to support multiple green parts in unbound powder surrounding the green parts, a decaking tool to remove unbound powder from around the green parts, a camera to photograph green parts on the platform as unbound powder is removed from around the green parts, and a controller operatively connected to the camera. The controller is programmed to detect a pattern of light intensity in the photographs and, in response to a determination a detected pattern matches a reference pattern, modulate or stop the decaking tool.

11 Claims, 4 Drawing Sheets

(51) Int. Cl.
   *B33Y 10/00* (2015.01)
   *B29C 64/357* (2017.01)
   *B29C 64/165* (2017.01)
   *B22F 10/14* (2021.01)

(56) References Cited

U.S. PATENT DOCUMENTS

2018/0304361 A1* 10/2018 Gibson .................... B22F 5/10
2021/0162509 A1*  6/2021 Ferrar .................... B33Y 30/00
2022/0281172 A1*  9/2022 Hutchinson ............ B33Y 40/00

* cited by examiner

DECAKING 3D PRINTED PARTS

BACKGROUND 3D printers convert a digital representation of an object into a physical object. 3D printers are used to manufacture objects with complex geometries using a variety of materials including thermoplastics, polymers, ceramics and metals. In powder based 3D printing, successive layers of a powdered build material are formed and portions of each layer solidified in a desired pattern to build up the layers of the 3D object. 3D printing is also commonly referred to as additive manufacturing.

DRAWINGS

The same part numbers designate the same or similar parts throughout the figures.

DESCRIPTION

Figure 1:
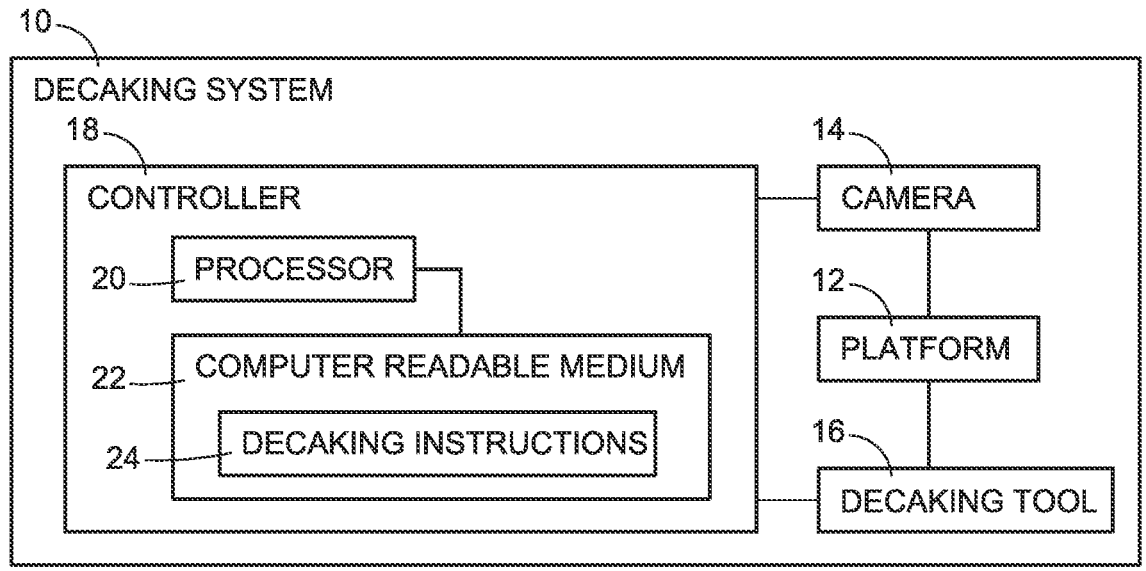
FIG. 1 illustrates an example system for decaking green parts printed with a powder based 3D printer.

Metal objects may be printed by selectively applying a liquid binding agent to portions of each of successive layers of metal powder to bind together those portions of the powder corresponding to a solid layer of the object. The binding agent is usually cured, for example using heat and/or ultra violet energy, to bind the powder more securely for subsequent handling. The bound object, commonly referred to as a "green part", is heated in a sintering furnace to fuse the bound metal powder. Before sintering, however, green parts must be removed from the surrounding mass of unbound powder in a process commonly referred to as "decaking." In a typical decaking process, the "build" platform that support the parts during printing is vibrated to break up the unbound powder to flow down and away from the parts through holes in the platform. Any unbound powder clinging to the green parts after decaking is removed in a cleaning process sometimes referred to as "depowdering."

As the bulk of the unbound powder "cake" breaks up and falls away during decaking, the now unsupported green parts sometimes move around on the vibrating platform. Parts move faster and farther as more and more of the surrounding powder is removed. Moving parts that collide with each other and/or with adjacent structures sometimes break. A new decaking technique has been developed to automatically modulate and then stop the decaking process according to the amount of unbound powder removed. The pace of decaking is slowed as more powder is removed to reduce the risk of damaging part movements and then stopped when enough powder has been removed.

In one example, the decaking process includes vibrating a platform supporting green parts surrounded by a mass of unbound powder, photographing the green parts on the vibrating platform as the unbound powder is removed from around the green parts, detecting a pattern of light intensity in the photographs, determining a detected pattern matches a reference pattern, and then modulating or stopping the vibration. The decaking system may be calibrated based on the relative intensity of light reflected from the platform, unbound powder, and green parts. For a lighter powder on a darker platform, for example, the intensity of the light reflected off the "cake" may decrease as more powder is removed and more of the platform is visible, and the pattern of light intensity detected in the photographs includes progressively more darker pixels and fewer brighter pixels. For a darker powder on a lighter platform, for another example, the intensity of the light reflected off the "cake" may increase as more powder is removed and more of the platform is visible, and the pattern of light intensity detected in the photographs includes progressively more brighter pixels and fewer darker pixels.

The reference pattern may include a series of reference patterns each corresponding to an increasing amount of unbound powder that has been removed from around the green parts. The intensity of the vibration can then be reduced when the detected pattern matches each of the reference patterns and then stopped when the desired amount of powder is removed. Determining a detected pattern matches a reference pattern may be implemented, for example, by identifying progressively more darker pixels and fewer brighter pixels in the photographs (or the other way around) or by counting an increasing number of holes visible in the photographs.

These and other examples described below illustrate but do not limit the scope of the patent which is defined in the Claims following this Description.

As used in this document: "and/or" means one or more of the connected things; a "computer readable medium" means any non-transitory tangible medium that can embody, contain, store, or maintain information and instructions for execution by a processor and may include, for example, circuits, integrated circuits, ASICs (application specific integrated circuits), hard drives, random access memory (RAM), read-only memory (ROM), and flash memory; and a "green part" means a 3D printed object in which the powder is bound but not fully fused.

FIG. 1 illustrates an example system 10 for decaking green parts printed with a powder based 3D printer. Referring to FIG. 1, decaking system 10 includes a platform 12, a camera 14 to photograph green parts on platform 12, and a decaking tool 16. Decaking tool 16 may be implemented, for example, as a vibrator to vibrate platform 12 and/or a blower to blow unbound powder away from green parts on platform 12. It is expected that platform 12 usually will be implemented with holes through which powder may flow away from the green parts during decaking. In some implementations, the green parts are printed and decaked on platform 12. Any suitable digital still or video camera may be used for camera 14. If a still camera 14 is used, the intensity patterns in a series of photographs taken periodically during decaking, at regular intervals for example, may be compared to one or multiple reference patterns to modulate and/or stop vibrator 16. If a video camera 14 is used, the light intensity may be monitored continuously from the stream of photographs and compared to the reference pattern(s).

Decaking system 10 also includes a controller 18 operatively connected to camera 14 and vibrator 16. Controller 18 includes the programming, processing and associated memory resources, and the other electronic circuitry and components to control the operative elements of system 10. Controller 18 may include distinct control elements for different components. Decaking controller 18 may be part of or separate from the controller for a 3D printer. Controller 18 in FIG. 1 includes a processor 20 and a computer readable medium 22 with decaking instructions 24 that represent programming to photograph the green parts during decaking with a still camera or a video camera, detect patterns of light intensity in the photographs, determine that a detected pattern matches a reference pattern, and then modulate and/or turn off the vibrator, blower or other decaking tool 16.

Figure 2:
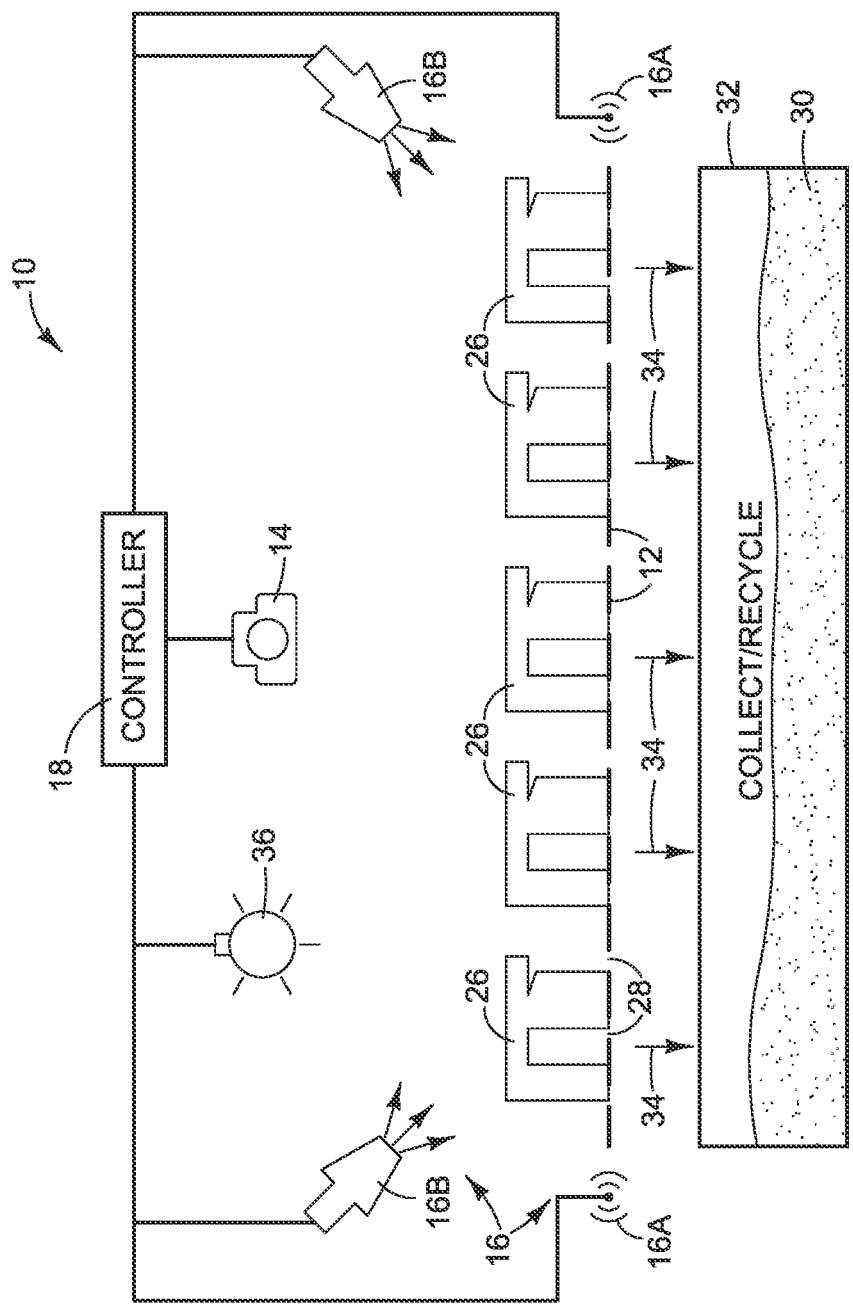
FIG. 2 illustrates an example system for decaking green parts printed with a powder based 3D printer.

FIG. 2 illustrates an example decaking system 10. Referring to FIG. 2, decaking system 10 includes a platform 12 that supports green parts 26 for decaking. Platform 12 may also support green parts 26 for printing. In one example, green parts 26 are printed and decaked on platform 12 in the 3D printer and then transported for cleaning to a separate depowdering station. In another example, platform 12 is part of a portable build unit that is transported to a separate decaking station after green parts 26 are printed. A decaking tool 16 includes a vibrator 16A and blowers 16B. Vibrator 16A vibrates platform 12 during decaking to break loose and separate unbound powder 30 from around parts 26. Blowers 16B blow air or another gas to remove unbound powder 30 from around green parts 26. While decaking tool 16 includes a vibrator and a pair of blowers in FIG. 2, other implementations are possible. For example, a decaking tool 16 may include only a vibrator 16A or only a blower 16B (or pair of blowers 16B). Unbound powder 30 flows through holes 28 in the vibrating platform 12, for example to a collection tank 32 for recycling or disposal. In other examples, unbound powder 30 is recycled directly to a printing supply. A vacuum may be applied to platform 12, as indicated by arrows 34, if desired to help remove powder 30 from platform 12.

Controller 18 is operatively connected to camera 14 to photograph parts 26 during decaking and to decaking tool 16 to control the force and frequency of decaking, for example by modulating the force and frequency of vibrator 16A vibrating and/or blowers 16B blowing, based on photographs from camera 14. Although only one camera 14 is shown in FIG. 2, multiple cameras may be used. System 10 may also include a lamp 36 as a source of diffuse light to illuminate parts 26 while camera 14 photographs green parts 26 during decaking. Diffuse lighting may be desirable to enhance contrast for more distinct patterns of light intensity in the photographs from camera 14.

Figure 3:
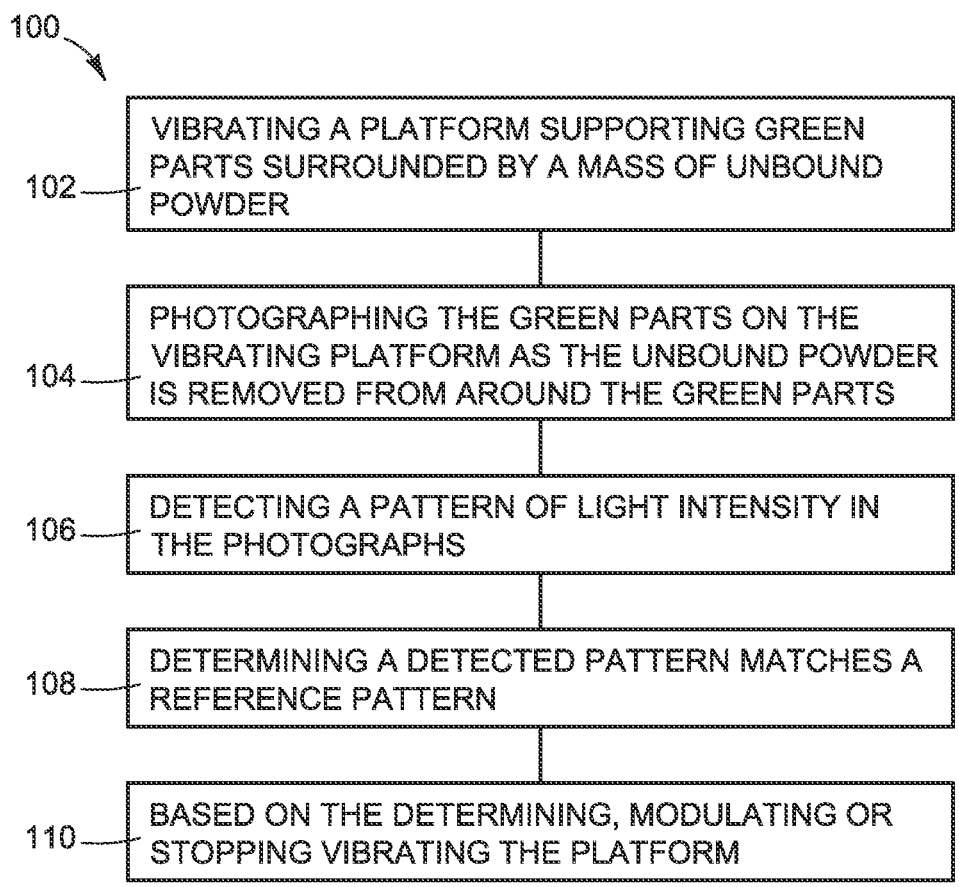
FIG. 3 illustrates an example process to decake a group of green parts printed with a powder based 3D printer.

FIG. 3 illustrates a process 100 to decake a group of green parts printed with a powder based 3D printer. Process 100 may be implemented, for example, with a processor 20 executing decaking instructions 24 on a controller 18 in a decaking system 10 as described above with reference to FIGS. 1 and 2. Referring to FIG. 3, process 100 includes vibrating a platform supporting green parts surrounded by a mass of unbound powder (block 102), photographing the green parts on the vibrating platform as the unbound powder is removed from around the green parts (block 104), detecting a pattern of light intensity in the photographs (block 106), determining a detected pattern matches a reference pattern (block 108), and based on the determining, modulating or stopping vibrating the platform (block 110). Process 100 may also include illuminating the green parts on the vibrating platform with diffuse light while photographing the green parts, for example as described above with reference to FIG. 2.

In one example, determining a detected pattern matches a reference pattern at block 108 includes identifying more darker regions and fewer brighter regions in a pattern of decaked green parts compared to a pattern of caked green parts. In another example, detecting a pattern of light intensity in the photographs at block 106 includes detecting a number of holes in a platform supporting the parts and determining a detected pattern matches a reference pattern at block 108 includes determining the number of detected holes exceeds a threshold number of holes.

Figure 4:
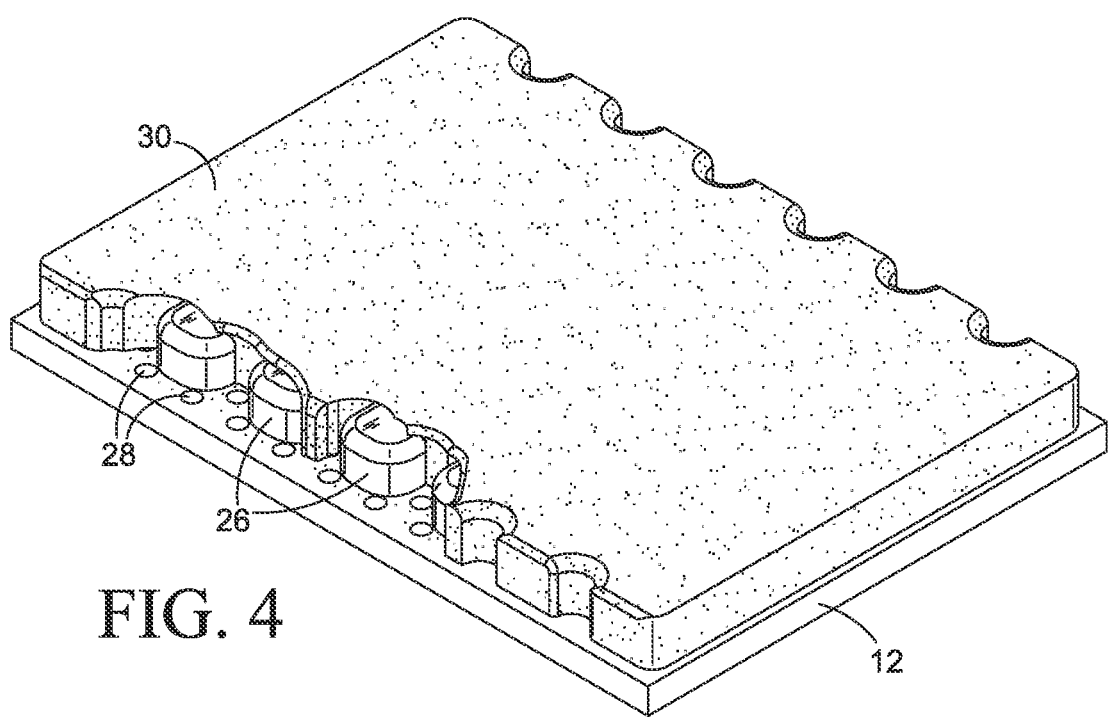
FIG. 4 illustrates one example of a group of green parts in a cake of unbound build material powder near the beginning of a decaking process.
Figure 5:
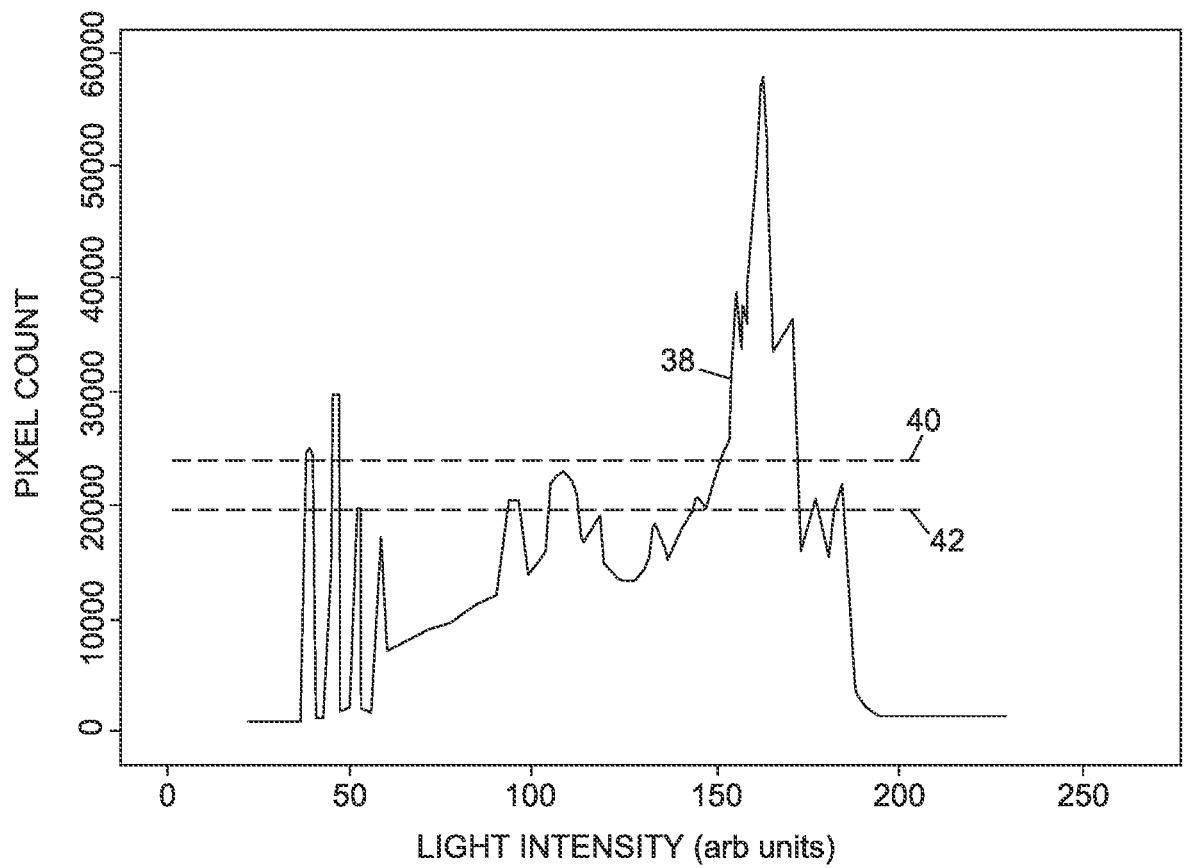
FIG. 5 is a histogram illustrating one example of a pattern of light intensity near the beginning of a decaking process, for example as shown in FIG. 4.
Figure 6:
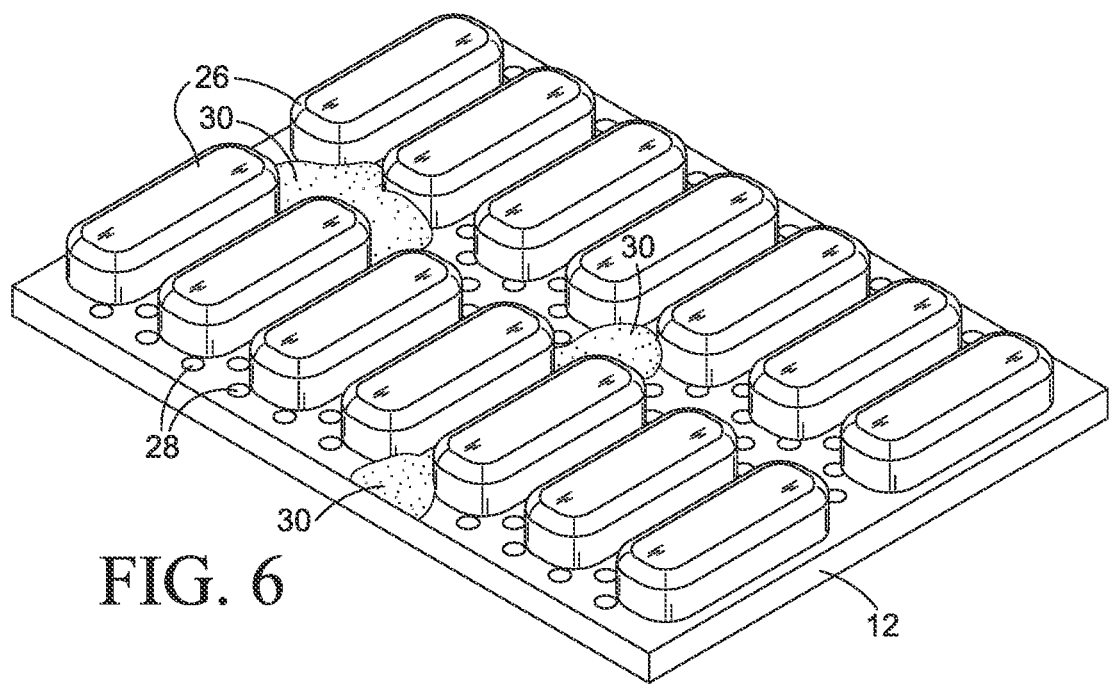
FIG. 6 illustrates one example of a group of green parts near the end of a decaking process.
Figure 7:
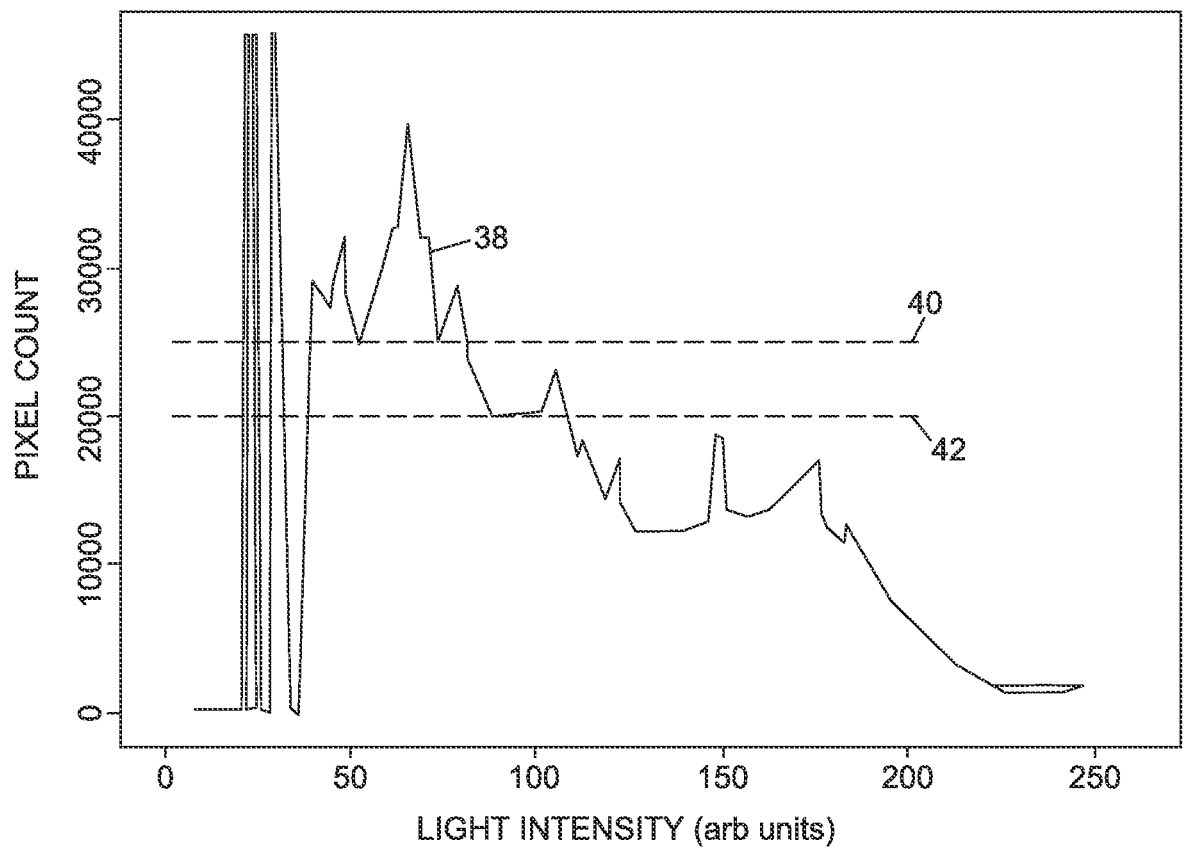
FIG. 7 is a histogram illustrating one example of a pattern of light intensity near the end of a decaking process, for example as shown in FIG. 6.

FIG. 4 illustrates a group of green parts 26 in a mass of unbound build material powder 30 surrounding the green parts near the beginning of a decaking process, such as might be taken by a camera 14 in FIGS. 1 and 2. FIG. 5 is a histogram illustrating one example of a pattern of light intensity near the beginning of a decaking process, for example as shown in FIG. 4, such as might be detected by a controller 18 in FIGS. 1 and 2. FIG. 6 illustrates a group of green parts 26 near the end of the decaking process, such as might be taken by a camera 14 in FIGS. 1 and 2. FIG. 7 is a histogram illustrating one example of a pattern of light intensity near the end of a decaking process, for example as shown in FIG. 6, such as might be detected by a controller 18 in FIGS. 1 and 2. In each histogram, light intensity is represented in arbitrary units along the horizontal axis from lower intensity (i.e., darker) to higher intensity (i.e., brighter) and the number of pixels detected at each intensity is represented along the vertical axis from fewer pixels to more pixels.

As shown in FIG. 4, green parts 26 are buried in a mass of unbound powder 30 near the beginning of the decaking process. The corresponding histogram of light intensity in FIG. 5 shows a pattern 38 with more higher intensity pixels and fewer lower intensity pixels. As shown in FIG. 6, green parts 26 are exposed near the end of the decaking process as much of the unbound powder has been removed. The corresponding histogram of light intensity in FIG. 7 shows a pattern 38 with more lower intensity pixels and fewer higher intensity pixels compared to FIG. 5.

FIGS. 5 and 7 also show a series of reference patterns 40, 42 overlaid on the detected patterns 38. In this example, each reference pattern 40, 42 is a horizontal line representing a pixel count threshold for each of two corresponding levels of vibration (or other decaking technique). For example, a high level of vibration is applied when there are fewer lower intensity pixels (e.g., intensity<100) than higher intensity pixels (e.g., intensity>100) above threshold 40, as shown in FIG. 5, a reduced level of vibration is applied when there are more lower intensity pixels (e.g., intensity<100) than higher intensity pixels (e.g., intensity>100) above threshold 40, and vibration is stopped when there are no higher intensity pixels (e.g., intensity>100) above threshold 42, as shown in FIG. 7.

Detected and reference patterns will vary depending on the printing materials and processes, including the type and color of powder and binders used to print the green parts, and the relative strength of the green parts. The histograms with detected and reference patterns 38-42 in FIGS. 5 and 7 illustrate just one of many possible scenarios as the light intensity shifts from lighter to darker (or from darker to lighter) as the decaking process progresses. Although FIGS. 4 and 6 cover the entire platform, it may be desirable in some examples to photograph only part or parts of the platform to determine if and when to modulate or stop the decaking tool.

FIGS. 4 and 6 also show the emergence of an increasing number of holes 28 in platform 12 during decaking. FIG. 4 shows parts 26 earlier in the decaking process with fewer holes 28 exposed. FIG. 6 shows the parts 26 later in the decaking process with more holes 28 exposed. Detecting a pattern of light intensity at block 106 in FIG. 3 may be implemented by detecting the number of holes in the support platform, for example using a find contour function in OpenCV™, and determining that the detected pattern matches a reference pattern at block 108 in FIG. 3 may be implemented by determining that the number of detected holes exceeds a threshold.

The threshold may be a single threshold for modulating or turning off the decaking tool or a series of thresholds for modulating and turning off the decaking tool as more holes are detected during the decaking process. The threshold may represent an absolute number of holes or a percentage of the total number of holes in the platform. Other suitable threshold parameters may be possible. With only ambient lighting, each hole may be detected and counted as a dark spot in a photograph. With the platform lighted up from below (or from above), for example with a lamp 36 in FIG. 2, each hole may be detected and counted as a bright spot in the photograph.

As noted at the beginning of this Description, the examples shown in the figures and described above illustrate but do not limit the scope of the patent. Other examples are possible. Therefore, the foregoing description should not be construed to limit the scope of the patent, which is defined in the following Claims. "A" and "an" in the Claims means one or more. For example, "a camera" means one or more cameras and subsequent reference to "the camera" means the one or more cameras.

The invention claimed is:

1. A decaking system for 3D printing, comprising:
   a platform to support multiple green parts in unbound powder surrounding the green parts;
   a decaking tool to remove unbound powder from around the green parts;
   a camera to photograph green parts on the platform as unbound powder is removed from around the green parts; and
   a controller operatively connected to the camera and programmed to:
   detect a pattern of light intensity in the photographs of the green parts; and
   determine whether the pattern of light intensity that is detected matches a reference pattern by one or more of:
   identifying more darker regions and fewer brighter regions in a pattern of a decaked green part compared to a pattern of caked green part;
   identifying less darker regions and more brighter regions in a pattern of the decaked green part compared to the pattern of the caked green part; or
   counting an increasing number of holes visible in the photographs; and
   in response to a determination that the pattern of light intensity that is detected matches the reference pattern, modulate or stop the decaking tool.

2. The system of claim 1, wherein the decaking tool comprises a vibrator to vibrate the platform and/or a blower to blow air or another gas on to unbound powder on the platform.

3. The system of claim 1, comprising a lamp to illuminate the green parts on the platform with diffuse light while the camera is photographing the green parts.

4. The system of claim 1, wherein the reference pattern defines more darker regions and fewer brighter regions in a pattern of decaked green parts compared to a pattern of caked green parts.

5. The system of claim 1, wherein:
   the platform includes holes through which unbound powder may flow away from the green parts;
   the controller programmed to detect the pattern of light intensity in the photographs comprises the controller programmed to detect a number of holes in the platform; and
   the controller programmed to determine the detected pattern matches the reference pattern comprises the controller programmed to determine a detected number of holes exceeds a threshold number of holes.

6. A computer readable medium having processor executable instructions to, while decaking a green part printed with a powder based 3D printer:
   repeatedly photograph the green part and compare a pattern of light intensity in the photographs to a reference pattern until the pattern in a photograph matches the reference pattern;
   modulate or stop decaking the green part; and
   determine whether a detected pattern of light intensity matches the reference pattern by one or more of:
   identifying more darker regions and fewer brighter regions in a pattern of a decaked green part compared to a pattern of caked green part;
   identifying less darker regions and more brighter regions in a pattern of the decaked green part compared to the pattern of the caked green part; or
   counting an increasing number of holes visible in the photographs.

7. The medium of claim 6, having instructions to determine the detected pattern of light intensity matches the reference pattern by determining a number of holes detected in a platform supporting the green part exceeds a threshold number of holes.

8. The medium of claim 6 implemented in a controller for a decaking system.

9. A process to decake a group of green parts printed with a powder based 3D printer, the process comprising:
   vibrating a platform supporting multiple green parts surrounded by unbound powder;
   photographing the green parts on the vibrating platform as the unbound powder is removed from around the green parts;
   detecting a pattern of light intensity in the photographs;
   determining a detected pattern matches a reference pattern, wherein determining a detected pattern comprises at least one of:
   identifying more darker regions and fewer brighter regions in a pattern of a decaked green part compared to a pattern of a caked green part;
   identifying less darker regions and more brighter regions in the pattern of the decaked green part compared to the pattern of the caked green part; or
   counting an increasing number of holes visible in the photographs; and
   based on the determining, modulating or stopping vibrating the platform.

10. The process of claim 9, comprising illuminating the green parts with diffuse light while photographing the group of green parts.

11. The process of claim 9, wherein:

the platform comprises a platform with holes; and detecting the pattern of light intensity in the photographs comprises detecting a number of holes in the vibrating platform.

\* \* \* \* \*